US010688899B2

(12) United States Patent
Kim et al.

(10) Patent No.: US 10,688,899 B2
(45) Date of Patent: Jun. 23, 2020

(54) CONFORMABLE AND RECONFIGURABLE OCCUPANT SUPPORT STRUCTURE

(71) Applicant: GM GLOBAL TECHNOLOGY OPERATIONS LLC, Detroit, MI (US)

(72) Inventors: Wonhee M. Kim, Royal Oak, MA (US); Amberlee S. Haselhuhn, Troy, MI (US); Richard J. Skurkis, Lake Orion, MI (US); Michael J. Walker, Shelby Township, MI (US); Ian J. Sutherland, Grosse Pointe, MI (US); Paul W. Alexander, Ypsilanti, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 15/727,757

(22) Filed: Oct. 9, 2017

(65) Prior Publication Data

US 2019/0106030 A1 Apr. 11, 2019

(51) Int. Cl.
*B60N 2/52* (2006.01)
*B60N 2/90* (2018.01)
(Continued)

(52) U.S. Cl.
CPC ............ *B60N 2/914* (2018.02); *B60N 2/2866* (2013.01); *B60N 2/2881* (2013.01); *B60N 2/665* (2015.04);
(Continued)

(58) Field of Classification Search
CPC ...... B60N 2/914; B60N 2/665; B60N 2/2866; B60N 2/2881; A47C 7/142; A47C 7/021; A47C 7/425; A61G 5/1045
(Continued)

(56) References Cited

U.S. PATENT DOCUMENTS 3,212,497 A * 10/1965 Dickinson ............ A61B 6/0421
602/6
3,297,023 A * 1/1967 Foley ................... A61H 9/0078
601/148
(Continued)

OTHER PUBLICATIONS

Kim, Yong-Jae et al.; A Novel Layer Jamming Mechanism With Tunable Stiffness Capability for Minimally Invasive Surgery; IEEE Transactions on Robotics 2013; pp. 1-12.
(Continued)

*Primary Examiner* — Kyle J. Walraed-Sullivan
(74) *Attorney, Agent, or Firm* — Quinn IP Law (57) ABSTRACT

An occupant support structure and a method of customizing an occupant support structure. The occupant support structure may comprise a base and a reconfigurable cushion carried by the base. The reconfigurable cushion may include an occupant support surface and a bladder. The bladder may include an outer wall that defines an inner cavity underlying the occupant support surface and two or more overlapping material layers disposed within the cavity. The overlapping material layers may be adapted to selectively transition from a compliant state to a rigid state and vice versa by selective control of a pressure condition across the outer wall of the bladder to reconfigure or conform the occupant support surface of the cushion to a contour of a portion of an occupant supported by the cushion.

19 Claims, 2 Drawing Sheets

(51) Int. Cl.
  *B60N 2/66* (2006.01)
  *B60N 2/806* (2018.01)
  *B60N 2/75* (2018.01)
  *B60N 2/28* (2006.01)
  *B60N 3/06* (2006.01)

(52) U.S. Cl.
  CPC .............. *B60N 2/763* (2018.02); *B60N 2/806* (2018.02); *B60N 2/995* (2018.02); *B60N 3/063* (2013.01)

(58) Field of Classification Search
  USPC ................................ 297/256.1; 5/644, 655.4
  See application file for complete search history.

(56) References Cited

U.S. PATENT DOCUMENTS

| | | | | |
|---|---|---|---|---|
| 3,613,671 A * | 10/1971 | Poor | .................... | A61H 9/0078 601/149 |
| 4,078,842 A * | 3/1978 | Zur | ........................ | A47C 7/021 297/229 |
| 4,190,286 A * | 2/1980 | Bentley | .................. | B60N 2/914 297/284.3 |
| 4,457,032 A * | 7/1984 | Clarke | ..................... | B60N 2/60 297/219.1 |
| 4,516,568 A * | 5/1985 | Baxter | .................. | A47C 7/425 297/230.14 |
| 4,789,202 A * | 12/1988 | Alter | ....................... | A47C 7/467 297/284.6 |
| 4,848,364 A * | 7/1989 | Bosman | ................ | A61F 2/0063 128/849 |
| 5,144,705 A * | 9/1992 | Rogers | ................. | A61B 5/1036 5/654 |
| 5,314,235 A * | 5/1994 | Johnson | ................ | A47C 7/425 297/284.5 |
| 5,379,471 A * | 1/1995 | Holdredge | ........... | A61G 5/1043 297/DIG. 8 |
| 5,429,852 A * | 7/1995 | Quinn | ..................... | A47C 7/18 297/452.26 |
| 5,456,519 A * | 10/1995 | Davis | ..................... | A47C 7/425 297/440.15 |
| 5,979,975 A * | 11/1999 | Hiraoka | ................. | A47C 7/748 297/180.11 |
| 6,092,249 A * | 7/2000 | Kamen | .................... | A47C 4/54 5/653 |
| 6,125,851 A * | 10/2000 | Walker | ................. | A61G 5/1091 128/845 |
| 6,203,105 B1 * | 3/2001 | Rhodes, Jr. | .............. | A47C 4/54 297/284.6 |
| 6,226,820 B1 * | 5/2001 | Navarro | ............... | A47C 27/085 5/654 |
| 6,851,755 B2 * | 2/2005 | Dinkel | ..................... | A47C 4/54 297/452.48 |
| 6,929,325 B1 * | 8/2005 | Goelo | ...................... | A47C 1/16 297/219.1 |
| 7,059,678 B1 * | 6/2006 | Taylor | ..................... | A47C 7/405 297/284.4 |
| 7,270,377 B2 * | 9/2007 | Schmitz | ................ | A47C 7/425 297/230.1 |
| 8,262,160 B2 * | 9/2012 | Mafi | ...................... | A47K 3/122 297/219.1 |
| 9,233,630 B2 * | 1/2016 | Amirault | ............. | B60N 2/2866 |
| 9,402,779 B2 * | 8/2016 | Brown | ................. | A61H 9/0078 |
| 9,445,933 B2 * | 9/2016 | Williams | ............ | A61F 5/05833 |
| 9,777,753 B2 * | 10/2017 | Niiyama | ............... | F15B 15/103 |
| 9,907,210 B2 * | 2/2018 | Buvid | ................. | H05K 7/20618 |
| 10,136,563 B2 * | 11/2018 | Buvid | ................ | H05K 7/20836 |
| 2003/0030319 A1 * | 2/2003 | Clapper | .................... | A47C 4/54 297/452.41 |
| 2006/0091716 A1 * | 5/2006 | Fortune | .................... | A47C 4/54 297/452.41 |
| 2007/0096519 A1 * | 5/2007 | Conforti | .................. | A47C 7/62 297/218.2 |
| 2012/0019033 A1 * | 1/2012 | Kelly | ..................... | B60N 2/2866 297/250.1 |
| 2012/0310126 A1 * | 12/2012 | Bureau | ............... | A61F 5/05833 602/6 |
| 2014/0191544 A1 * | 7/2014 | Comber, V | .............. | A47D 1/10 297/224 |
| 2014/0265491 A1 * | 9/2014 | Galbreath | .............. | B60N 2/643 297/284.1 |
| 2014/0333107 A1 * | 11/2014 | Seki | ......................... | B60N 2/62 297/284.1 |
| 2015/0107233 A1 * | 4/2015 | Ou | .......................... | F15B 15/10 60/327 |
| 2015/0113735 A1 * | 4/2015 | Anderson | ............... | A47C 7/021 5/654 |
| 2015/0164229 A1 * | 6/2015 | Popp | ...................... | A47C 7/021 5/652.1 |
| 2015/0164237 A1 * | 6/2015 | Kearse | .................. | A47C 27/084 5/652.1 |
| 2016/0066716 A1 * | 3/2016 | Rao | ...................... | A47G 9/1036 5/644 |
| 2016/0095775 A1 * | 4/2016 | Dzioba | .............. | A61G 7/05776 5/644 |
| 2016/0236594 A1 * | 8/2016 | Dry | ........................ | B60N 2/525 |
| 2016/0242562 A1 * | 8/2016 | Karschnik | ............ | A47C 27/083 |
| 2017/0043690 A1 * | 2/2017 | Dry | ......................... | B60N 2/36 |
| 2017/0066350 A1 * | 3/2017 | Dry | ..................... | B60N 2/42718 |
| 2017/0071805 A1 * | 3/2017 | Geva | ...................... | A61G 5/14 |
| 2017/0150819 A1 * | 6/2017 | Jones | ..................... | A47C 27/10 |
| 2017/0341334 A1 * | 11/2017 | Corrigan | ............ | A61F 5/05833 |
| 2017/0360590 A1 * | 12/2017 | Corrigan | .............. | B65D 75/002 |
| 2018/0251047 A1 * | 9/2018 | Line | ........................ | B60N 2/90 |
| 2018/0319296 A1 * | 11/2018 | Sasaki | .................. | B60N 2/4221 |
| 2019/0021717 A1 * | 1/2019 | Corrigan | ............ | A61F 5/05833 |
| 2019/0105973 A1 * | 4/2019 | Kim | ............................ | B60J 7/12 |
| 2019/0106030 A1 * | 4/2019 | Kim | ........................ | B60N 2/914 |
| 2019/0106916 A1 * | 4/2019 | Sutherland | ............ | E05C 17/025 |

OTHER PUBLICATIONS

Manti, Mariangela et al.; Stiffening in Soft Robotics; A Review of the State of the Art; Digital Object Identifier 10.1109/MRA.2016.2582718; Date of publication: Sep. 13, 2016; IEEE Robotics & Automation Magazine; pp. 93-106.

Ou, Jifei et al.; jamSheets: Thin Interfaces with Tunable Stiffness Enabled by Layer Jamming; 8 pages.

U.S. Appl. No. 15/728,034; entitled "Stretchable Adjustable-Stiffness Assemblies," filed Oct. 9, 2017.

U.S. Appl. No. 15/728,059; entitled "Removable Roof Panel for a Vehicle," filed Oct. 9, 2017.

U.S. Appl. No. 15/728,072; entitled "Hybrid Tonneau Cover," filed Oct. 9, 2017.

* cited by examiner

CONFORMABLE AND RECONFIGURABLE OCCUPANT SUPPORT STRUCTURE

TECHNICAL FIELD

The present disclosure relates generally to occupant support structures and to methods of customizing occupant support structures.

INTRODUCTION

A support structure for an occupant of a vehicle may be configured to allow the occupant to reposition the support structure for purposes of optimizing the occupant's comfort and use of the vehicle. For example, vehicle seats may be configured to allow for horizontal, vertical, and/or tilting adjustment to accommodate occupants of different sizes, e.g., occupants of different heights. In addition to adjusting the location of an occupant support structure within a vehicle, it may be desirable to provide an occupant with the ability to tailor the physical contours of the support structure to more closely align with the physical contours of the occupant, for example, to further optimize the comfort, functionality, and safety of the occupant. In order to accommodate multiple different occupants of a vehicle, it may be desirable to provide each occupant with the ability to reconfigure the physical contours of the support structure to more closely align with their individual physical shape.

SUMMARY

An occupant support structure may comprise a base and a reconfigurable cushion carried by the base. The reconfigurable cushion may be adapted to support a portion of an occupant and may include an occupant support surface and a bladder. The bladder may include an outer wall that defines an inner cavity underlying the occupant support surface and two or more overlapping material layers disposed within the cavity. The overlapping material layers may be adapted to selectively transition from a compliant state to a rigid state and vice versa by selective control of a pressure condition across the outer wall of the bladder. When an equal pressure condition is established across the outer wall of the bladder, the overlapping material layers may be adapted to exhibit a compliant state and to deform in response to an external load applied by an occupant on the occupant support surface of the cushion. Alternatively, when a negative pressure condition is established across the outer wall of the bladder, the overlapping material layers may be adapted to exhibit a rigid state and to prevent deformation of the occupant support surface in response to application or removal of an external load on the occupant support surface of the cushion. Selectively transitioning the overlapping material layers from a compliant state to a rigid state may allow the occupant support surface of the cushion to be reconfigured or to be conformed to a contour of a portion of an occupant supported by the cushion.

The overlapping material layers may be positioned within the cavity such that confronting surfaces of adjacent material layers are in direct contact with each other. Also, the overlapping material layers may be configured such that, when a negative pressure condition is established across the outer wall of the bladder, friction is generated between the confronting surfaces of the layers such that shearing of the layers is prevented.

At least one of the overlapping material layers may comprise a composite material that includes a network of rigid regions interconnected by one or more compliant regions. The compliant regions may be configured to bias the rigid regions toward one another and to resist relative movement of the rigid regions in response to an applied external load. In one form, the rigid regions may be physically separated from one another by voids. In one form, at least one of the overlapping material layers also may comprise a continuous layer of a physically and chemically homogenous material.

The overlapping material layers may comprise alternating first and second layers. In one form, the first layers may have a different material composition or configuration than the second layers. For example, the first layers may comprise a rigid material and the second layers may comprise a compliant material.

The occupant support structure may include one or more biasing members located between the base and the reconfigurable cushion. The one or more biasing members may be configured to bias the cushion away from the base and to resist movement of the cushion toward the base in response to an external load applied by an occupant on the occupant support surface of the cushion.

The bladder may include an opening through which fluid may be evacuated from or introduced into the cavity to establish an intended pressure condition within the cavity.

The occupant support structure may include a vacuum pump and evacuation system for selectively establishing a subatmospheric pressure condition within the cavity.

The reconfigurable cushion may include an elastomeric pad overlying the bladder and a cover overlying the elastomeric pad, and the occupant support surface may be defined by the cover.

The reconfigurable cushion may include a first bladder and a second bladder. Each of the first and second bladders may include an outer wall defining an inner cavity underlying the occupant support surface and two or more overlapping material layers disposed within their respective cavities. The first and second bladders may be adapted to individually or collectively transition from a compliant state to a rigid state and vice versa by selective control of a pressure condition across the outer walls of the first and second bladders. Selectively transitioning the first and second bladders from a compliant state to a rigid state may allow first and second zones of the occupant support surface of the cushion to be reconfigured or to be conformed to a contour of a portion of an occupant supported by the cushion.

The reconfigurable cushion may comprise a seat back, a seat bottom, an armrest, a footrest, or a headrest for an occupant of a vehicle.

A seat for an occupant of a vehicle may include the aforementioned occupant support structure. In such case, the seat may comprise a driver's seat, a passenger seat, a child seat, or a booster seat.

A method of customizing an occupant support structure, wherein the occupant support structure may comprise a reconfigurable cushion including an occupant support surface and a bladder underlying the occupant support surface. The bladder may include an outer wall defining an inner cavity and two or more overlapping material layers disposed within the cavity. The method may comprise establishing a first pressure condition across the outer wall of the bladder such that the cushion exhibits an initial configuration. A first occupant may be positioned in contact with the occupant support surface of the cushion such that a portion of the first occupant presses against the occupant support surface and conforms the occupant support surface to a contour of the portion of the first occupant. A second pressure condition may be established across the outer wall of the bladder while the first occupant is in contact with the occupant support surface to frictionally engage the overlapping material layers and to impart a predetermined rigidity to the cushion. The second pressure condition may be maintained across the outer wall of the bladder such that the occupant support surface retains the contour of the portion of the first occupant.

The first pressure condition may be established across the outer wall of the bladder by equalizing the pressure across the outer wall of the bladder.

The second pressure condition may be established across the outer wall of the bladder by establishing a subatmospheric pressure condition within the cavity.

The portion of the occupant may comprise a head, back, shoulder, lumbar, buttocks, leg, arm, or foot of the occupant.

The bladder may be returned to the first pressure condition to return the cushion to its initial configuration. Then, a second occupant may be positioned in contact with the occupant support surface of the cushion such that a portion of the second occupant presses against the occupant support surface and conforms the occupant support surface to a contour of the portion of the second occupant. A second pressure condition may be established across the outer wall of the bladder while the second occupant is in contact with the occupant support surface to frictionally engage the overlapping material layers and to impart a predetermined rigidity to the cushion. The second pressure condition may be maintained across the outer wall of the bladder such that the occupant support surface retains the contour of the portion of the second occupant.

DETAILED DESCRIPTION

The presently disclosed occupant support structure can be used to accommodate multiple different occupants by providing an occupant with the ability to selectively reconfigure and conform a physical contour of the support structure to align with their individual physical shape. The occupant support structure includes a customizable and reconfigurable cushion that can transition from a compliant state to a rigid state to selectively conform the cushion to a contour of an occupant supported by the cushion. For example, the cushion may be held in a compliant state so that the cushion can be molded into a negative impression of a portion of an occupant, and then the cushion may be controlled to transition from a compliant state to a rigid state to retain the negative impression of the occupant. The cushion may be allowed to return to a compliant state so that the cushion can be reconfigured and conformed to a different occupant or to a different portion of the same occupant. Transitioning the cushion from a compliant state to a rigid state may be accomplished via a technique referred to as "layer jamming."

As used herein, the terms "rigid" and "compliant" are employed in a relative sense. For example, when the terms rigid and compliant are used to describe the attributes of a material and/or regions of a material, it is intended that the compliant material and/or the compliant regions have the capacity to bend and/or stretch in response to an applied force that is less than the force that would need to be applied to the rigid material and/or the rigid regions to bend and/or stretch the rigid material or regions. Both rigid and compliant materials and/or regions may be non-brittle and may have the ability to bend and/or stretch in response to an applied force without fracture or fatigue.

Figure 1:
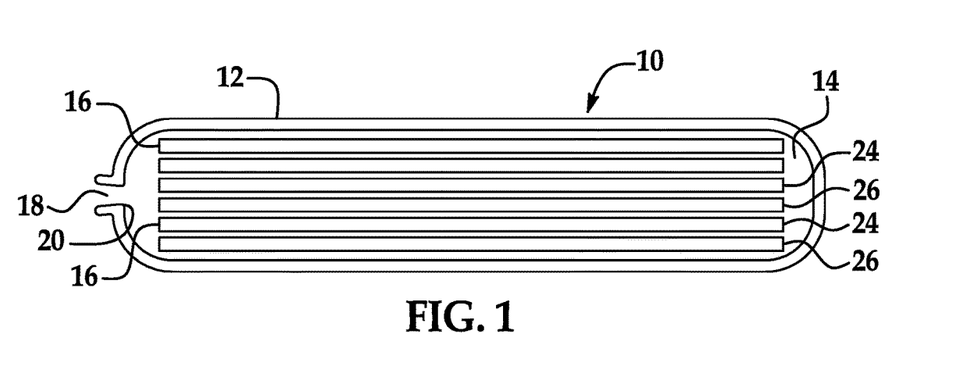
FIG. 1 is a schematic cross-sectional view of a bladder in a compliant state, the bladder includes an outer wall that defines a cavity in which multiple thin overlapping material layers are enclosed, in accordance with one aspect of the present disclosure.
Figure 2:
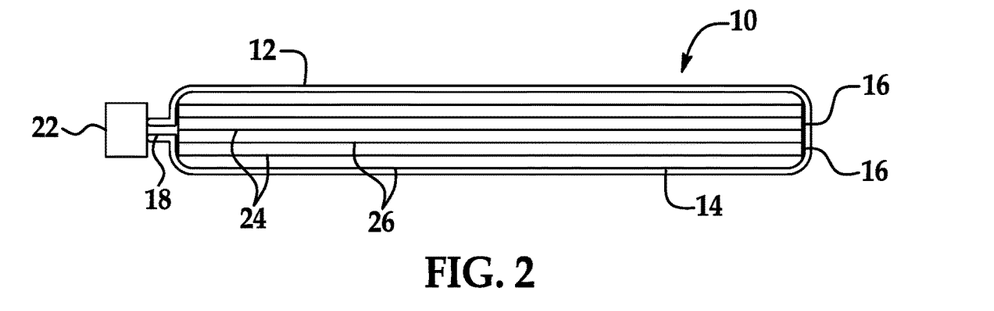
FIG. 2 is a schematic cross-sectional view of the bladder of FIG. 1 in a rigid state.

FIGS. 1 and 2 depict a thin bladder 10 that can transition from a compliant state (FIG. 1) to a rigid state (FIG. 2) using a layer jamming technique. The bladder 10 includes an outer wall 12 defining an inner cavity 14. Multiple overlapping material layers 16 are enclosed within the cavity 14. The material layers 16 are positioned within the cavity 14 such that confronting surfaces of adjacent material layers 16 are in direct contact. In FIGS. 1 and 2, the layers 16 are aligned one on top of the other. However, in other embodiments, the layers 16 may be offset or staggered relative to one another.

The cavity 14 is in fluid communication with a passageway 18 via an opening 20 in the wall 12 of the bladder 10. A fluid (e.g., air) can be added to or evacuated from the cavity 14 via the opening 20 to increase or decrease the pressure within the cavity 14. For example, fluid may be evacuated from the cavity 14 to establish a subatmospheric pressure condition within the cavity 14, and fluid may be added to the cavity 14 to increase the pressure within the cavity 14 and/or to equalize the pressure inside the cavity 14 with the pressure outside of the cavity 14 (at an exterior surface of the bladder 10). In one form, a vacuum pump and evacuation system 22 may be used to evacuate fluid from the cavity 14 via the passageway 18 to establish a subatmospheric pressure condition within the cavity 14.

The bladder 10 and the layers 16 can transition from a compliant state to a rigid state, and vice versa, by establishing of a pressure differential across the outer wall 12 of the bladder 10. In FIG. 1, the pressure inside the bladder 10 (inside the cavity 14) is generally equal to the pressure outside of the bladder 10 (outside of the cavity 14) and the bladder 10 is in a compliant state. For example, the pressure inside the bladder 10 may be exactly the same as the pressure outside of the bladder 10, or the pressure inside the bladder 10 may be within ±5% of the pressure outside of the bladder 10. In one form, the pressure inside and outside of the bladder 10 may be generally equal to atmospheric pressure. In this compliant state, the overlapping material layers 16 can move relative to one another (for example, by sliding or shearing past each other) and can deform relatively easily in response to an applied force or external load.

In FIG. 2, the pressure inside the bladder 10 (inside the cavity 14) is less than the pressure outside of the bladder 10 (outside of the cavity 14) and the bladder 10 is in a rigid state. For example, the pressure inside the bladder 10 may be less than the pressure outside of the bladder 10 by a factor of 10 or more. In one form, the pressure inside the bladder 10 may be less than atmospheric pressure and the pressure outside of the bladder 10 may be equal to atmospheric pressure. As shown in FIG. 2, in this rigid state, the overlapping material layers 16 are compressed against each other by the outer wall 12 of the bladder 10, which increases the friction between the layers 16 and substantially reduces the ability of the layers 16 to move relative to one another (for example, by sliding or shearing past each other) such that the layers 16 are "jammed" and the rigidity of the layers 16 and the bladder 10 is increased. The degree of rigidity imparted to the layers 16 and the bladder 10 can be tuned by controlling the number of layers 16, the area of the confronting surfaces of the layers 16, the frictional properties of the layers 16, and/or the difference in pressure across the outer wall 12 of the bladder 10.

When the bladder 10 is in a compliant state, the bladder 10 and the layers 16 can be deformed or molded into a desired configuration, for example, by application of an external load. Once the desired configuration is achieved, fluid may be evacuated from the cavity 14 to transform the bladder 10 and the layers 16 into a rigid state and to "lock" the bladder 10 and the layers 16 in the desired configuration. While in a rigid state, the bladder 10 and the layers 16 can maintain the desired configuration—even if the applied external load is removed—as long as the pressure within the cavity 14 is less than the pressure outside of the bladder 10. Fluid may be added actively or passively to the cavity 14 to equalize the pressure across the wall 12 of the bladder 10 to return the bladder 10 and the layers 16 to a compliant state and to their original configuration.

The bladder 10 may be of unitary, one-piece construction and may be formed of any suitable deformable, stretchable, resilient, water-proof, air-tight material. For example, the bladder 10 may suitably be made of an elastomer, such as a natural or synthetic rubber.

The overlapping material layers 16 may be made of thin solid porous or non-porous flexible materials that can generate a sufficient amount of friction between the confronting surfaces of the material layers 16 when the layers 16 are compressed against one another such that relative movement between the layers 16 (e.g., shearing of the layers 16) is prevented. Some examples of suitable materials for the overlapping material layers 16 include: bonded networks of woven or non-woven synthetic or natural fibers, porous or non-porous amorphous elastic polymers (i.e., elastomers), e.g., natural or synthetic rubbers and thermoplastics, such as polyurethane foam.

In some embodiments, the overlapping material layers 16 may comprise alternating first and second layers 24, 26, with the first layers 24 having a different material composition and/or configuration than the second layers 26. For example, the first layers 24 may comprise a rigid material and the second layers 26 may comprise a compliant material. Additionally or alternatively, the first and second layers 24, 26 may have different material compositions that are configured to come together to provide a suitable amount of friction between the layers 24, 26, for example, to inhibit shearing of the layers 24, 26. In one form, the first layers 24 may have relatively smooth surfaces and the second layers 26 may have relatively rough or patterned surfaces. In one form, the first layers 24 may comprise a porous material and the second layers 26 may comprise a non-porous material. Some examples of suitable porous materials include: bonded networks of woven or non-woven synthetic or natural fibers and elastomeric foams. Some examples of suitable non-porous materials include: non-porous elastomers and hard plastics.

The first and/or second layers 24, 26 may comprise a continuous layer of material or a discontinuous layer of material having a plurality of perforations or voids formed therein. In one form, the first and/or second layers 24, 26 may comprise a continuous layer of a composite material that is made up of patches or regions of different types of material. For example, the first and/or second layers 24, 26 may comprise a plurality of interconnected rigid regions and compliant regions. The compliant regions may provide the layers 24, 26 with the ability to flex and/or stretch upon application of an external load so that the layers 24, 26 can be planar or non-planar and can conform to complex, curved, or non-planar surfaces. The compliant regions also may allow the rigid regions to move independently with respect to one another while remaining physically connected and in place within the layers 24, 26. When the bladder 10 is in a compliant state, the rigid regions and/or the compliant regions may comprise planar structures having a variety of different shapes, e.g., circular, elliptical, rectangular, square, triangular, hexagonal, or irregular. The rigid regions and/or the compliant regions may be arranged within the layers 24, 26 in a regular (e.g., patterned) or stochastic manner.

In one form, the first and/or second layers 24, 26 may comprise a continuous layer of material including a plurality of rigid regions physically connected to one another by a compliant matrix. The rigid regions may be coupled to the compliant matrix, for example, by being partially or entirely physically encased within the matrix or by being coupled to a major facing surface of the flexible matrix. In one form, the first and/or second layers 24, 26 may be made by adhering a plurality of rigid members to a major surface of a compliant membrane. In another form, the first and/or second layers 24, 26 may be made of a thin elastic polymer sheet having a plurality of rigid regions physically connected to one another by a compliant matrix, and wherein the rigid regions may be formed in the sheet by increasing the crosslink density of the polymer in those regions.

Figure 3:
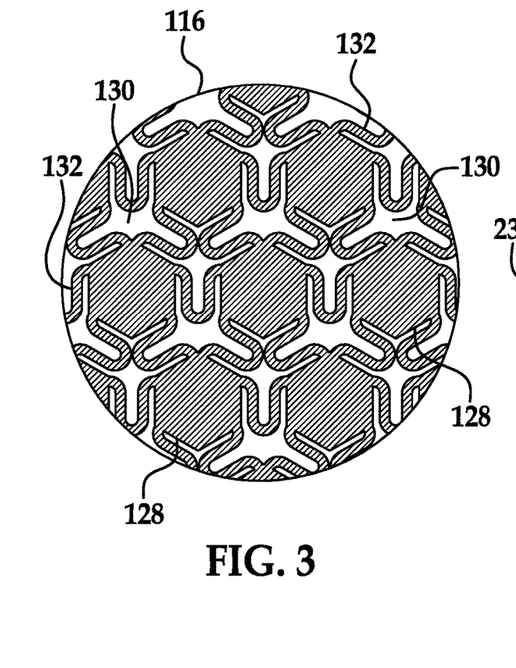
FIG. 3 is a top view of a thin material layer that includes a network of rigid regions interconnected by compliant regions, in accordance with one aspect of the present disclosure.

Referring now to FIG. 3, a top view of a portion of a thin material layer 116 is depicted that may be used in the bladder 10 of FIG. 1 in accordance with one or more embodiments of the present disclosure. As shown, the layer 116 includes a network of rigid islands 128 separated from one another by voids 130 and interconnected to one another by a plurality of compliant bridges 132. The bridges 132 may provide the material layer 116 with the ability to flex and/or stretch upon application of an external load so that the layer 116 can be readily molded or formed into a desired configuration. In addition, the bridges may allow the islands 128 to move independently with respect to one another while remaining physically connected and in place within the layer 116.

At the same time, the rigid islands 128 may provide the layer 116 with a sufficient amount of resilience so that, when the layer 116 is compressed against or between one or more other material layers, a sufficient amount of friction can be generated between the confronting surfaces of the layers to inhibit movement of the layers relative to one another. In some embodiments, the bridges 132 may be configured to bias the islands 128 toward each other and to resist increased separation between the islands 128 in response to the application of an external load. Each of the compliant bridges 132 may extend between two of the rigid islands 128 and may follow a rectilinear, curvilinear, bent, wavy, or serpentine path between the islands 128.

Figure 4:
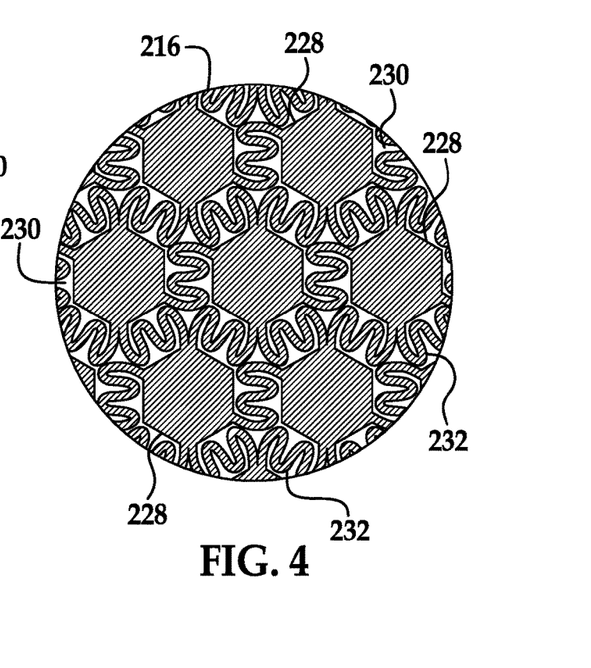
FIG. 4 is a top view of another thin material layer that includes a network of rigid regions interconnected by compliant regions, in accordance with another aspect of the present disclosure.

Referring now to FIG. 4, a top view of a portion of another thin material layer 216 is depicted that may be used in the bladder 10 of FIG. 1 in accordance with one or more embodiments of the present disclosure. The layer 216 is similar in many respects to the layer 116 depicted in FIG. 3, and a description of common features may not be repeated here. As shown in FIG. 4, the layer 216 includes a network of rigid islands 228 separated from one another by voids 230 and interconnected to one another by a plurality of compliant bridges 232. The bridges 232 may provide the material layer 216 with the ability to flex and/or stretch upon application of an external load so that the layer 216 can be readily molded or formed into a desired configuration. At the same time, the islands 228 may provide the layer 216 with a sufficient amount of resilience so that, when the layer 216 is compressed against or between one or more other material layers, a sufficient amount of friction can be generated between the confronting surfaces of the layers to inhibit movement of the layers relative to one another. Each of the compliant bridges 232 may extend between two of the rigid islands 228 and may follow a rectilinear, curvilinear, bent, wavy, or serpentine path between the islands 228.

In FIGS. 3 and 4, the islands 128, 228 are physically separated from one another by voids 130, 230 in the layers 116, 216. However, in other embodiments, the layers 116, 216 may be continuous and free of voids. In such case, the islands 128, 228 may be connected to one another by a single compliant bridge, for example, by a sheet of compliant material (not shown).

One or more of the layers 116, 216 may be used in combination with one or more different material layers to produce a stack of overlapping material layers (not shown) that can be incorporated into a bladder 10 for purposes of carrying out a layer jamming technique. In one form, the stack of overlapping material layers may include alternating first and second layers, with the first layers exhibiting the structure of the material layer 116 shown in FIG. 3, and the second layers comprising continuous layers of a physically and chemically homogenous compliant material. In another form, the stack of overlapping material layers may include alternating first and second layers, with the first layers exhibiting the structure of the material layer 216 shown in FIG. 4, and the second layers comprising continuous layers of a physically and chemically homogenous compliant material.

Figure 5:
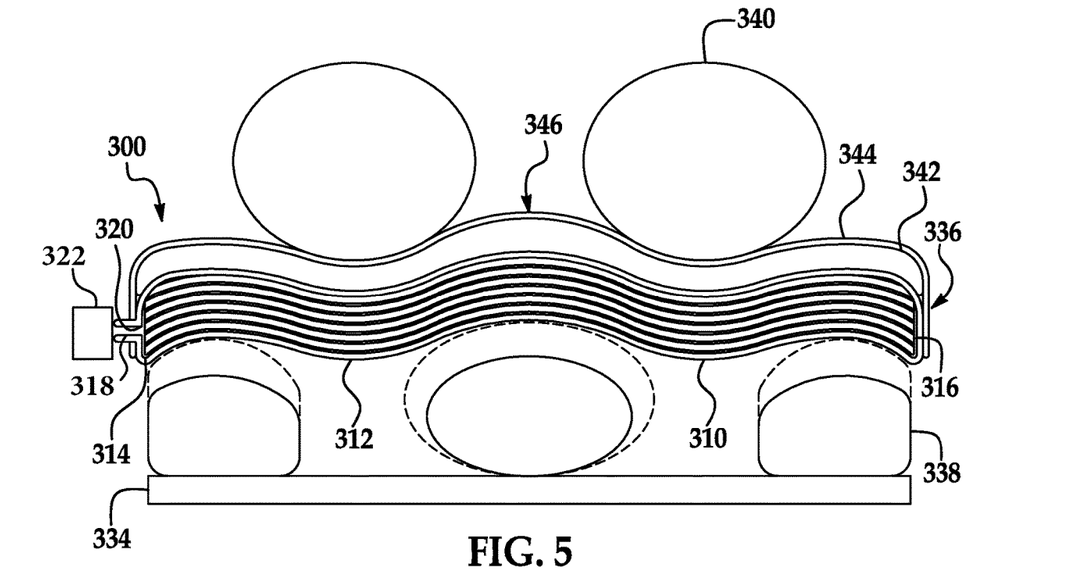
FIG. 5 is a schematic cross-sectional view of an occupant support structure including a base and a reconfigurable cushion, with portions of an occupant supported on an occupant support surface of the cushion.

FIG. 5 depicts an occupant support structure 300, in accordance with one or more embodiments of the present disclosure. The support structure 300 includes a base 334, a reconfigurable cushion 336 carried by the base 334, and optionally one or more biasing members 338 extending between the cushion 336 and the base 334. The base 334 may be configured to couple the support structure 300 to a component of a vehicle (not shown). The reconfigurable cushion 336 is adapted to support one or more portions of a vehicle occupant 340 and includes a bladder 310, an elastomeric pad 342 overlying the bladder 310, a cover 344 overlying the pad 342 and the bladder 310, and an occupant support surface 346 defined by an exterior surface of the cover 344.

The bladder 310 extends underneath the occupant support surface 346 of the cushion 336 and is configured to selectively transition the cushion 336 from a compliant state to a rigid state and vice versa to conform the cushion 336 to a contour of the vehicle occupant 340 and optionally to subsequently reconfigure the cushion 336 to conform to a different contour of the same or a different vehicle occupant 340. The bladder 310 is similar in many respects to the bladder 10 depicted in FIGS. 1 and 2 and may embody some or all of the features thereof. A description of common features between the bladders 10, 310 may not be repeated here. The bladder 310 includes an outer wall 312 defining an inner cavity 314 that extends underneath the occupant support surface 346 of the cushion 336. Two or more material layers 316 are enclosed within the cavity 314 and are arranged such that the layers 316 at least partially overlap one another. In addition, the material layers 316 are positioned within the cavity 314 such that confronting surfaces of adjacent material layers 316 are in direct contact with each other. In FIG. 5, the layers 316 are aligned one on top of the other; however, in other embodiments, the layers 316 may be offset or staggered relative to one another.

The cavity 314 is in fluid communication with a passageway 318 via an opening 320 in the wall 312 of the bladder 310. In the embodiment depicted in FIG. 5, the opening 320 is located in a side portion of the bladder 10. However, in other embodiments, the opening 320 may be located in another suitably hidden or discrete location. For example, the opening 320 may be located in a bottom portion of the bladder 310 that faces toward the base 334. A fluid (e.g., air) can be added to or evacuated from the cavity 314 via the opening 320 to increase or decrease the pressure within the cavity 314. For example, fluid may be evacuated from the cavity 314 to establish a subatmospheric pressure environment within the cavity 314, and fluid may be added to the cavity 314 to increase the pressure within the cavity 314 and/or to equalize the pressure inside the cavity 314 with the pressure outside of the cavity 314 (outside of the bladder 10). A vacuum pump and evacuation system 322 may be used to evacuate fluid from the cavity 314 via the passageway 318 to establish a subatmospheric pressure environment within the cavity 314.

The overlapping material layers 316 may be made of thin solid porous or non-porous flexible materials that can generate a sufficient amount of friction between the confronting surfaces of the material layers 316 when the layers 316 are compressed against one another such that relative movement between the layers 316 (e.g., shearing of the layers 316) is prevented. The number, size, elastic and frictional properties of the overlapping material layers 316 may be selected to provide a suitable level of rigidity to the cushion 336 when the cushion 336 is in a rigid state. The overlapping material layers 316 suitably may include one or more of the same materials as the layers 16, 24, 26.

In some embodiments, the material layers 316 may comprise alternating first and second layers, with the first layers having a different material composition and/or configuration than the second layers. For example, the first layers may comprise a rigid material and the second layers may comprise a compliant material. Additionally or alternatively, the first and second layers may have different material compositions that are configured to come together to provide a suitable amount of friction between the layers 316, for example, to inhibit shearing of the layers 316. In one form, the first layers may have relatively smooth surfaces and the second layers may have relatively rough or patterned surfaces. In one form, the first layers may comprise a porous material and the second layers may comprise a non-porous material. The first and/or second layers may comprise continuous layers of material or discontinuous layers of material having a plurality of perforations or voids formed therein. In some embodiments, the material layers 316 may comprise alternating first and second layers, with the first layers comprising continuous or discontinuous layers of a composite material, and the second layers comprising continuous layers of a physically and chemically homogenous material. In some embodiments, the layers 316 may be configured such that, when in a rigid state, certain regions of one or more of the layers 316 may preferentially deform at a lower applied external load than other regions.

In some embodiments, one or more of the layers 316 may comprise a continuous layer of a composite material that is made up of patches or regions of different types of material. For example, one or more of the layers 316 may a composite material that includes a plurality of physically interconnected rigid regions and compliant regions. The compliant regions may provide the layers 316 with the ability to flex and/or stretch upon application of an external load so that the layers 316 can be planar or non-planar and can conform to complex, curved, or non-planar surfaces. The compliant regions may allow the rigid regions to move independently with respect to one another while remaining physically connected and in place within the layers 316. When the bladder 310 is in a compliant state, the rigid regions and/or the compliant regions may comprise planar structures having a variety of different shapes, e.g., circular, elliptical, rectangular, square, triangular, hexagonal, or irregular. The rigid regions and/or the compliant regions may be arranged within the layers 316 in a regular (e.g., patterned) or stochastic manner.

In one form, one or more of the layers 316 may comprise a continuous layer of a composite material that includes a plurality of rigid regions physically connected to one another by a compliant matrix. The rigid regions may be coupled to the compliant matrix, for example, by being partially or entirely physically encased within the matrix or by being coupled to a major facing surface of the flexible matrix. In one form, one or more of the layers 316 may be formed by adhering a plurality of rigid members to a major surface of a compliant membrane. In another form, one or more of the layers 316 may be made of a thin elastic polymer sheet having a plurality of rigid regions physically connected to one another by a compliant matrix, and wherein the rigid regions may be formed in the sheet by increasing the crosslink density of the polymer in those regions.

Like the material layers 116, 216 depicted in FIGS. 3 and 4, one or more of the material layers 316 may comprise a composite material that includes a network of rigid regions (or islands) interconnected to one another by one or more compliant regions (or bridges). In one form, one or more of the material layers 316 may comprise a network of rigid islands separated from one another by voids and interconnected to one another by a plurality of compliant bridges. For example, one or more of the material layers 316 may consist of the material layer 116 or the material layer 216 depicted in FIGS. 3 and 4.

The elastomeric pad 342 extends over the bladder 310 and is coupled between the bladder 310 and the cover 344. The pad 342 may be configured to support the occupant 340 and to provide a soft comfortable feel to the occupant 340 supported on the cushion 336. Some examples of suitable materials for the elastomeric pad 342 include polyurethane foam.

The cover 344 is coupled to the pad 342 and may be configured to cover the elastomeric pad 342 and the bladder 310, to protect the pad 342 and the bladder 310, and/or to provide a desirable appearance and feel to the cushion 336. Some examples of suitable materials for the cover 344 include vinyl, woven or non-woven fabric (e.g., cotton, polyester, or nylon), leather, or a combination thereof. In one form, the cover 344 may comprise a layer of fabric coated on one or both sides with a layer of an elastomer (e.g., neoprene or silicone).

The one or more biasing members 338 are configured to bias the cushion 336 in a direction away from the base 334 and to resist movement of the cushion 336 in a direction toward the base 334 in response to an external load applied by the occupant 340 on the occupant support surface 346 of the cushion 336. In addition, the one or more biasing members 338 may be configured to provide a desired contour to the occupant support surface 346 of the cushion 336 when the occupant 340 is and is not supported on the cushion 336. The one or more biasing members 338 also may be configured to help position the occupant 340 in a desired location and in a desired orientation on the cushion 336. As such, the one or more biasing members 338 may be controlled to help evenly distributed the weight of the occupant 340 on the occupant support surface 346 of the cushion 336. Some examples of suitable biasing members 338 for use in the support structure 300 include springs, expandable (e.g., inflatable) containers, or a combination thereof.

In some embodiments, the one or more biasing members 338 may be reconfigurable and may be adapted to change size and/or shape in response to a vehicle command, which may be initiated by the occupant 340. For example, as shown in FIG. 5, the one or more biasing members 338 may initially exhibit a first size and shape, but may increase in size in response to a vehicle command. The ability of the biasing members 338 to individually or collectively change size and/or shape may allow the occupant 340 to customize or tailor the contour, orientation, and/or height of the occupant support surface 346 of the cushion 336 to improve the fit, support, and/or comfort of the cushion 336 to the occupant 340.

The cushion 336 may be controlled to conform to a contour of the vehicle occupant 340 and to subsequently re-conform to a different contour of the same or a different vehicle occupant 340 by selective control of a pressure condition across the outer wall 312 of the bladder 310. Initially, the pressure inside the bladder 310 (inside the cavity 314) may be controlled to be substantially the same as the pressure outside of the bladder 310 (outside of the cavity 314), for example, by allowing the pressure inside the bladder 310 to equalize with the pressure outside of the bladder 310. When a generally equal pressure condition is established across the outer wall 312 of the bladder 310 (i.e., when the pressure inside the bladder 310 is substantially the same as the pressure outside of the bladder 310), the bladder 310 is in a compliant state and the cushion 336 (including the bladder 310, pad 342, and cover 344) can be deformed or molded into a desired configuration, for example, by application of an external load. As such, the occupant 340 may be positioned on (for example, by being seated on) the occupant support surface 346 of the cushion 336 such that a portion of the occupant 340 presses against and exerts a force on the occupant support surface 346 that is sufficient to deform the cushion 336 and to conform the occupant support surface 346 of the cushion 336 to a contour of the portion of the occupant 340.

While the occupant 340 is positioned on the occupant support surface 346 of the cushion 336, a pressure differential may be established across the outer wall 312 of the bladder 310 such that the pressure inside the bladder 310 is less than the pressure outside of the bladder 310. The pressure inside the bladder 310 (inside the cavity 314) may be decreased, for example, by evacuating fluid (e.g., air) from the cavity 314 via the opening 320 in the wall 312 of the bladder 310. When a negative pressure condition is established across the bladder 310 (i.e., when the pressure inside the bladder 310 is less than the pressure outside of the bladder 310), the bladder 310 is in a rigid state and the cushion 336 (including the bladder 310, pad 342, and cover 344) cannot be easily deformed in response to an applied external load on the occupant support surface 346. In addition, when the bladder 310 is in a rigid state, the cushion 336 will not change shape or revert to an initial configuration, even if a previously applied external load is removed. As such, after the bladder 310 sufficiently transitions from a compliant state to a rigid state, the occupant 340 may move away from the occupant support surface 346 of the cushion 336 and the occupant support surface 346 will retain a rigid contour of the portion of the occupant 340.

The occupant support surface 346 of the cushion 336 may be allowed to return to its initial configuration by allowing the pressure inside the bladder 310 to equalize with the pressure outside of the bladder 310. Thereafter, the occupant support surface 346 of the cushion 336 may be reconfigured to a different contour of the same or a different occupant 340 by positioning the same or a different occupant 340 on the occupant support surface 346 of the cushion 336 such that a portion of the occupant 340 presses against and exerts a force on the occupant support surface 346 that is sufficient to deform the cushion 336 and to conform the occupant support surface 346 of the cushion 336 to the contour of the portion of the occupant 340.

Accordingly, the presently disclosed vehicle occupant support structure 300 can be used to personalize or customize one or more support structures of a vehicle to optimize the fit, support, weight distribution, comfort, and/or safety of the same occupant 340 or a different occupant of the vehicle.

Figure 6:
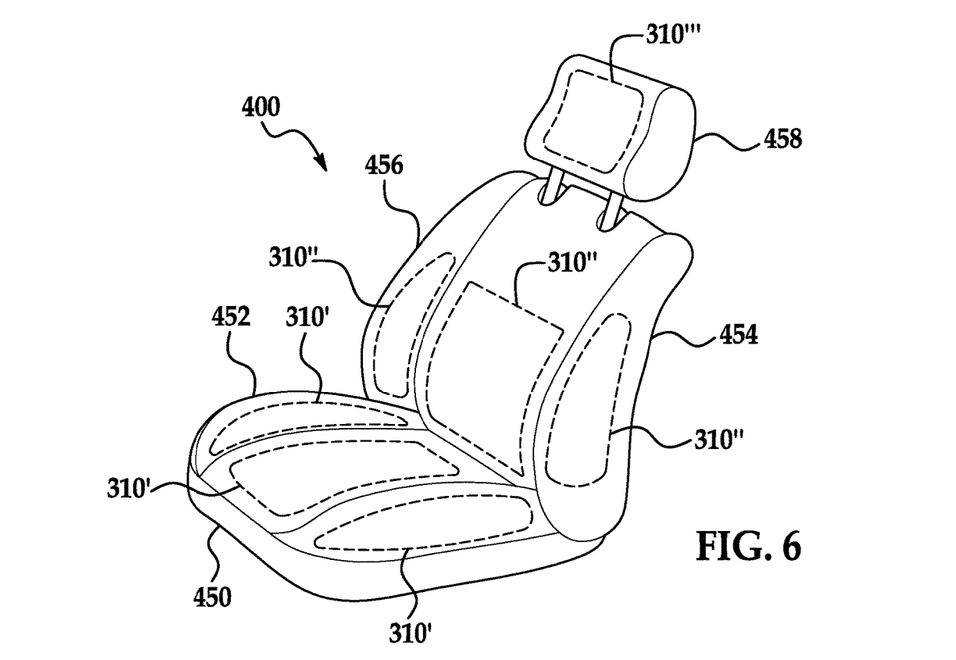
FIG. 6 is a perspective view of a vehicle seat including a seat bottom, a seat back, and a headrest, wherein the seat bottom, the seat back, and the headrest each may comprise one or more occupant support structures (shown in phantom) that can be controlled to transition from a compliant state to a rigid state and vice versa to conform and reconfigure the vehicle seat to a portion of an occupant seated on the vehicle seat.

FIG. 6 depicts an exemplary embodiment of a seat 400 for an occupant of a vehicle (not shown), in accordance with one or more embodiments of the present disclosure. By way of example, the seat 400 may comprise a driver's seat, a passenger seat, a child seat, or a booster seat. The seat 400 includes a seat bottom 450 including a pair of lateral seat bottom bolsters 452, a seat back 454 including a pair of lateral seat back bolsters 456, and a headrest 458. The vehicle occupant support structure 300, including the bladder 310 (and optionally the base 334, the one or more biasing members 338, the elastomeric pad 342, and the cover 344) may be included in or integrated into one or more zones of the seat 400. For example, one or more bladders 310' may be included in or integrated into the seat bottom 450 and/or one or both of the lateral seat bottom bolsters 452. Additionally or alternatively, one or more bladders 310'' may be included in or integrated into the seat back 454 and/or one or both of the lateral seat back bolsters 456. Additionally or alternatively, one or more bladders 310''' may be included in or integrated into the headrest 458. Including or integrating one or more of the bladders 310', 310'', 310''' into the seat 400 may allow one or more zones of the seat 400 to individually or collectively conform to a portion of an occupant seated on the seat 400 by controlling the bladders 310 to selectively transition from a compliant state to a rigid state and vice versa by selective control of a pressure condition across the outer walls of the bladders 310', 310'', 310''', as discussed in further detail above with respect to FIGS. 1, 2, and 5. In embodiments where the seat 400 comprises a child seat or a booster seat, the bladders 310', 310'', and/or 310''' may allow various zones of the seat 400 to individually or collectively be periodically reconfigured to conform to a portion of an occupant seated on the seat 400 so that the seat 400 can be tailored to fit, support, and/or maintain the safety and comfort of the occupant as the occupant grows. Although not shown in the drawings, the vehicle occupant support structure 300, including the bladder 310 (and optionally the base 334, the one or more biasing members 338, the elastomeric pad 342, and the cover 344) additionally or alternatively may be included in one or more other support structures of a vehicle, for example, in an armrest or footrest for an occupant of the vehicle.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. An occupant support structure comprising:
   a base;
   a reconfigurable cushion carried by the base and adapted to support a portion of an occupant, the reconfigurable cushion including an occupant support surface and a bladder including an outer wall that defines an inner cavity underlying the occupant support surface and two or more overlapping material layers disposed within the inner cavity; and
   one or more biasing members located between the base and the reconfigurable cushion, wherein the one or more biasing members bias the reconfigurable cushion away from the base and resist movement of the reconfigurable cushion toward the base in response to an external load applied on the occupant support surface of the reconfigurable cushion,
   wherein the two or more overlapping material layers are adapted to selectively transition from a compliant state to a rigid state and vice versa by selective control of a pressure condition across the outer wall of the bladder to conform the occupant support surface of the reconfigurable cushion to a contour of a portion of an occupant supported by the reconfigurable cushion,
   wherein a negative pressure condition exists across the outer wall of the bladder such that the two or more overlapping material layers are locked in the rigid state and the occupant support surface of the reconfigurable cushion exhibits a rigid contour that is complementary to a contour of a portion of an occupant previously supported by the reconfigurable cushion, even if the occupant is not currently supported by the reconfigurable cushion, and
   wherein the rigid contour exhibited by the occupant support surface of the reconfigurable cushion is at least partially defined by the one or more biasing members located between the base and the reconfigurable cushion.

2. The support structure of claim 1 wherein the two or more overlapping material layers are positioned within the inner cavity such that confronting surfaces of adjacent overlapping material layers are in direct contact with each other and friction is generated between the confronting surfaces of the two or more overlapping material layers such that shearing of the two or more overlapping material layers is prevented.

3. The support structure of claim 1 wherein at least one of the two or more overlapping material layers comprises a composite material including rigid regions physically interconnected to one another by one or more compliant regions, and wherein the one or more compliant regions are configured to bias the rigid regions toward one another and to resist relative movement of the rigid regions in response to an applied external load.

4. The support structure of claim 3 wherein the rigid regions are physically separated from one another by voids.

5. The support structure of claim 3 wherein at least one of the two or more overlapping material layers comprises a continuous layer of a physically and chemically homogenous material.

6. The support structure of claim 1 wherein the two or more overlapping material layers comprise alternating first and second layers, and wherein the first layers have a different material composition or configuration than the second layers.

7. The support structure of claim 6 wherein the first layers comprise a rigid material and the second layers comprise a compliant material.

8. The support structure of claim 1 wherein the bladder includes an opening through which fluid may be evacuated from or introduced into the inner cavity to establish an intended pressure condition within the inner cavity.

9. The support structure of claim 1 including a vacuum pump and evacuation system that establishes a subatmospheric pressure condition within the inner cavity.

10. The support structure of claim 1 wherein the reconfigurable cushion includes an elastomeric pad overlying the bladder and a cover overlying the elastomeric pad, and wherein the occupant support surface is defined by the cover.

11. The support structure of claim 1 wherein the reconfigurable cushion includes a first bladder and a second bladder, wherein each of the first and second bladders include an outer wall defining an inner cavity underlying the occupant support surface and two or more overlapping material layers disposed within the inner cavity, and wherein the first and second bladders are adapted to individually or collectively transition from a compliant state to a rigid state and vice versa by selective control of a pressure condition across the outer walls of the first and second bladders to respectively conform first and second zones of the occupant support surface of the reconfigurable cushion to a contour of a portion of an occupant supported by the reconfigurable cushion.

12. The support structure of claim 1 wherein the reconfigurable cushion comprises a seat back, a seat bottom, an armrest, a footrest, or a headrest for an occupant of a vehicle.

13. A seat for an occupant of a vehicle including the occupant support structure of claim 1, wherein the seat comprises a driver's seat, a passenger seat, a child seat, or a booster seat.

14. The support structure of claim 1 wherein the two or more overlapping material layers disposed within the inner cavity consist of alternating first and second layers, wherein the first layers comprise a porous material and the second layers comprise a non-porous material, and wherein the porous material comprises an elastomeric foam.

15. The support structure of claim 1 wherein at least one of the two or more overlapping material layers comprises a continuous layer of a composite material that includes compliant regions and rigid regions spaced apart from one another and physically interconnected to one another by the compliant regions.

16. The support structure of claim 15 wherein the compliant regions comprise a continuous compliant matrix, and wherein the rigid regions are coupled to the compliant matrix by being encased within the compliant matrix or by being coupled to a major surface of the compliant matrix.

17. The support structure of claim 16 wherein the compliant regions and the rigid regions are made of an elastic polymer, and wherein a crosslink density of the rigid regions is greater than that of the compliant regions.

18. The support structure of claim 1 wherein at least one of the two or more overlapping material layers comprises a composite material including rigid islands separated from one another by voids and interconnected to one another by compliant bridges, wherein the compliant bridges are configured to bias the rigid islands toward one another and to resist relative movement of the rigid islands in response to an applied external load, and wherein, when the two or more overlapping material layers are in a compliant state, the rigid islands comprise planar structures having hexagonal shapes, with each of the compliant bridges extending between and following a curvilinear path between two of the rigid islands.

19. The support structure of claim 18 wherein at least one of the rigid islands is respectively physically connected to six adjacent rigid islands by six compliant bridges.

\* \* \* \* \*